United States Patent Office 2,976,211
Patented Mar. 21, 1961

2,976,211
DISPERSANT COMPOSITIONS AND TOXICANT CONCENTRATES CONTAINING THE SAME
Paul L. Lindner, Evanston, Ill., assignor, by mesne assignments, to Witco Chemical Company, Inc., New York, N.Y., a corporation of Delaware
No Drawing. Filed Feb. 21, 1958, Ser. No. 716,567
19 Claims. (Cl. 167—42)

My invention relates to the production of new and useful dispersant compositions and to liquid biocidal toxicant compositions, particularly in the form of toxicant concentrates, containing said dispersants.

It has been found to be highly desirable, in certain situations, to be able to apply to an earth soil, in which plant or vegetable life is grown or contemplated to be grown, both water-soluble fertilizer material and also a desired pesticide, to wit, water-insoluble organic solvent-soluble insecticide or soil fumigant, hereafter generically called biocidal toxicant, in the form of a single composition. Efforts to provide such a composition, for instance, in the form of a stable, mobile, pourable or pumpable liquid emulsion, by simple mixing, present certain serious problems. The water-soluble fertilizer materials comprise water-soluble compounds, typical examples of which are potassium chloride, potassium nitrate, ammonium nitrate, ammonium sulphate, potassium sulphate, ammonium phosphate, and urea, with or without supplemental materials.

When dissolved in water to form strong solutions, particularly solutions approximating concentrated solutions, constituting the aqueous phase, and admixed with biocidal toxicant concentrates containing biocidal toxicants dissolved in organic solvents and insoluble in said aqueous phase, or solutions of such biocidal toxicants in organic solvents wherein said latter solutions, constituting the oleaginous phase, are insoluble in said aqueous phase, unstable dispersions form which readily and promptly separate out in the form of layers. Efforts to emulsify such aqueous phases and such oleaginous phases by means of usual types of emulsifying agents used in the toxicant emulsion field have proved entirely unsatisfactory. Non-ionic emulsifiers of the type of the polyoxyethylene derivatives of lipophilic materials, for instance, polyethylene glycol ethers of sorbitan monostearate, polyethylene glycol ethers of sorbitan monooleate, alkyl phenoxy polyoxyethanols, iso-octyl phenol polyoxyethylene ethers, and the like, have been found to be ineffective since they are salted out by the strong electrolytes in the high concentrations used in liquid fertilizer solutions. Similarly, higher alkyl aryl sulfonates, such as alkali metal, ammonium, magnesium or calcium salts of dodecyl benzene sulfonate, and the like, have likewise been found to be entirely unsatisfactory, whether used in conjunction with the non-ionic emulsifiers of the type mentioned above or by themselves.

The problem of providing satisfactory emulsions of aqueous liquid fertilizer solutions, particularly strong solutions, containing upwards of 20% of water-soluble fertilizer ingredients such as the monovalent and polyvalent ionic compounds described above and up to saturated aqueous solutions of said fertilizer solutions, with water-insoluble organic solvent-soluble biocidal toxicants has, so far as I am aware, not remotely been solved despite intensive efforts to do so. In certain instances, by means of special combinations of ingredients, it has been possible to prepare liquid fertilizer-biocidal toxicant compositions, but these must be prepared immediately prior to being used and must be used promptly since, among other things, their stability is of extremely short duration. Other special combinations of ingredients have been suggested, for instance, which are of use in liquid fertilizer-biocidal toxicant compositions but only if the liquid fertilizer contains trivalent phosphate ions and urea. In the presence of monovalent ions such as chlorides or nitrates, such latter compositions are of no commercial value because the emulsifying action of the combination of ingredients is destroyed.

I have discovered new and useful biocidal toxicant concentrates (and dispersant compositions for use therein) which, when admixed, by simple mixing, with liquid fertilizer compositions in the form of strong aqueous solutions, say in excess of 20% concentration up to saturation, produce homogeneous emulsions or dispersions which remain usable for periods of the order of at least several hours. My invention makes it unnecessary to pre-mix the biocidal toxicant concentrate with water just prior to admixing it with the liquid fertilizer solution, as is required with certain heretofore known biocidal toxicant concentrates. All that is necessary, in the case of biocidal toxicant concentrates made in accordance with my invention, is simple mixing or agitation with the liquid fertilizer solution. Moreover, my novel biocidal toxicant concentrates can effectively be used with liquid fertilizer compositions irrespective of whether the latter contain monovalent or polyvalent ions, and they are also usable with more dilute solutions of liquid fertilizers as, for instance, those containing of the order of 10 to 15% of solids. Thus, they have a universality of utility which is a most important practical consideration.

I have discovered that if there are utilized, in admixture, certain materials falling into two separate classes, and which are employed in certain ratios with respect to each other, all as is hereafter described in detail, a synergistic effect is obtained which brings about the entirely unpredictable and unexpected results which are achieved by my present invention.

The first of these ingredients, which for convenience, may be called the ($a$) ingredient, comprises a compound which is water-soluble or readily water-dispersible and which is a sulfopolycarboxylic acid amide of a higher molecular weight amine in which the amine contains a hydrocarbon radical, usually an alkyl radical, having from 12 to 26 carbon atoms, and in which both the sulfonic group and carboxyl group in each sulfopolycarboxylic acid radical is neutralized by an amine, or in which either the sulfonic group or the carboxyl group in each sulfopolycarboxylic acid radical is neutralized by an amine and the hydrogen in the other of the said groups is replaced by an alkali metal. Thus, in the aforesaid compounds, there is present at least one sulfopolycarboxylic acid radical, to wit

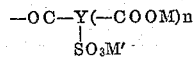

wherein Y is the completely decarboxylated residue of the polycarboxylic acid, both M and M' may be organic substituted ammonium radicals, or either M or M' may be an organic substituted ammonium radical in which case the other may be an alkali metal, and $n$ is 1 or 2.

I. Certain of said ($a$) ingredients can be represented by the formula

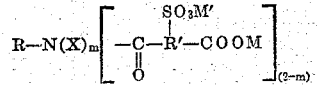

wherein R is an aliphatic hydrocarbon radical containing from 12 to 26 carbon atoms; X is hydrogen; R' is the completely decarboxylated residue of a dicarboxylic acid, M and M' are organic substituted ammonium radicals, or either M or M' is an alkali metal and the other is an organic substituted ammonium radical, m is zero or 1.

II. Others of said (a) ingredients can be represented by the formula $$R-NX-alkylene-N=\left(\begin{array}{c}C-R'-COOM\\ \| \ |\\ O\ SO_3M'\end{array}\right)_2$$

where R, R', M and M' have the same connotation as specified in group I above; X is hydrogen or $$\begin{array}{c}-C-R'-COOM\\ \| \ |\\ O\ SO_3M'\end{array}$$

and alkylene contains from 2 to 8 carbon atoms and comprises ethylene, propylene or butylene, especially propylene.

The radical R of said (a) ingredient is derived from amines, notably aliphatic amines, containing from 12 to 26 carbon atoms and in which there is a long chain hydrocarbon containing at least 12 carbon atoms. Typical of such amines are dodecyl amine, tetradecyl amine, hexadecyl amine, oleyl amine, linoleyl amine, stearyl amine, ricinoleyl amine palmitoleyl amine, abietyl amine, 2-n-butyl octyl amine, 2-butyl tetradecyl amine, melissyl amine, cottonseed oil fatty-propyl amines, corn oil fatty-butyl amines, coconut oil fatty-ethyl amines, soya oil fatty amine-propyl amines, and tall oil amine-propyl amines.

The polycarboxylic acids, the sulfo-derivatives of which are employed in the preparation of the (a) ingredient, can be chosen from a large group, typical or illustrative examples of which are maleic acid, fumaric acid, tartaric acid, glutaconic acid, itaconic acid, adipic acid, phthalic acid, sebacic acid, citric acid, acontic acid, tricarballylic acid, and glutaric acid. Of particular utility are the aliphatic sulfopolycarboxylic acids, especially the water-soluble sulfodicarboxylic acids containing from 4 to 8 carbon atoms. The sulfosuccinic acid derivatives are particularly preferred.

The salt-forming radicals represented by M or M' comprise, in the case of M, alkali metals (which term is here used to mean sodium, potassium, lithium and ammonium); and, in the case of M and M', organic substituted ammonium radicals. The latter, which most advantageously are water-soluble lower molecular weight amines, may be selected from a wide group, typical examples of which are dimethylamine; diethylamine; triethylamine; propylamine; monoisopropylamine, diisopropylamine, triisopropylamine, and commercial mixtures of said isopropylamines; butyl amine; amyl amine; monoisopropanolamine, diisopropanolamine, triisopropanolamine and commercial mixtures of said isopropanolamines; ethanolamines such as monoethanolamine, diethanolamine, triethanolamine, and commercial mixtures thereof; polyamines such as aminoethyl ethanolamine, ethylenediamine, diethylenetriamine, hydroxyethyl ethylenediamine, and hexamethylenediamine; hexylamine; cyclohexylamine; dimethylbenzylamine, benzylamine; morpholine; methylcyclohexylamine; alkyl alkanolamines such as ethyl diethanolamine and diethyl ethanolamine; furfurylamine; piperidine; 2-amino-2-methyl-1-propanol; 2-amino-1-butanol; methyl piperidine, and the like, and compatible mixtures of any two or more thereof.

In the case of said first or (a) ingredient, it will be seen that, in the case of sulfodicarboxylic acid amide derivatives, the said salt may be the organic substituted ammonium di-salt, that is, where both M and M' are organic substituted ammonium radicals, which may be the same or different organic substituted ammonium radicals; or the said salt may be a half alkali metal and half organic substituted ammonium salt which is the case where M is an alkali metal and M' is an organic substituted ammonium radical. Of particular utility, as the first ingredient, are the organic substituted ammonium di-salts and the half ammonium half organic substituted ammonium salt of the sulfosuccinic acid amides of the long chain amines wherein said latter amines, as stated, contain a hydrocarbon chain of at least 12 carbon atoms. In the case of the sulfotricarboxylic acid amides, the said salt may be the organic substituted ammonium tri-salt, that is, where both M and M' are organic substituted ammonium radicals, which may be the same or different organic substituted ammonium radicals; or the said salt may be a one-third alkali metal and two-thirds organic substituted ammonium salt, in which case M is an organic substituted ammonium and M' is an alkali metal; or vice versa, that is, said salt may be a two-thirds alkali metal and one third organic substituted ammonium salt, in which case M is an alkali metal and M' is an organic substituted ammonium radical.

Illustrative examples of said (a) ingredient are the following (which include, also, the isomers thereof):

(1) $C_{12}H_{25}-NH-OC-CH_2-CH-COONH_4$
$\quad\quad\quad\quad\quad\quad\quad\quad\quad\quad | $
$\quad\quad\quad\quad\quad\quad\quad\quad SO_3H.H_2N-CH=(CH_3)_2$ Half ammonium half isopropylamine salt of the sulfosuccinic acid amide of dodecyl amine (2) $C_{18}H_{35}-NH-OC-CH_2-CH-COOH.H_2N-CH=(CH_3)_2$
$\quad\quad\quad\quad\quad\quad\quad\quad\quad\quad\quad\quad | $
$\quad\quad\quad\quad\quad\quad\quad\quad\quad SO_3H.H_2N-CH=(CH_3)_2$ Isopropyl amine di-salt of the sulfosuccinic acid amide of oleyl amine (3) $C_{16}H_{33}-NH-OC-CH_2-CH-COONa$
$\quad\quad\quad\quad\quad\quad\quad\quad\quad\quad | $
$\quad\quad\quad\quad\quad\quad\quad SO_3H.H_2N-CH_2-(CH_2)_2-CH_3$ Half sodium half butyl amine salt of the sulfosuccinic acid amide of cetyl amine (4) $R-NH-OC-CH_2-CH-COONH_4$
$\quad\quad\quad\quad\quad\quad\quad\quad | $
$\quad\quad\quad\quad\quad SO_3H.H_2N-CH=(CH_3)_2$ Half ammonium half isopropyl amine salt of the sulfosuccinic acid amide of soya fatty amines (R—NH— being the soya fatty amine radical)

(5) $C_{18}H_{37}-NH-OC-CH_2-CH-COONH_4\quad CH_2-CH_2$
$\quad\quad\quad\quad\quad\quad\quad\quad\quad\quad | \quad\quad\quad\quad / \ \ \backslash$
$\quad\quad\quad\quad\quad\quad\quad SO_3H.H_2N-CH\quad\quad CH_2$
$\quad\quad\quad\quad\quad\quad\quad\quad\quad\quad\quad\quad\quad\quad\backslash\ \ /$
$\quad\quad\quad\quad\quad\quad\quad\quad\quad\quad\quad\quad\quad\quad CH_2-CH_2$ Half ammonium half cyclohexylamine salt of the sulfosuccinic acid amide of stearyl amine (6)
$$R-NH-C_3H_6-N=\left[\begin{array}{c}OC-CH-CH_2-COOH.H_2N-CH=(CH_3)_2\\ |\\ SO_3NH_4\end{array}\right]_2$$

Half ammonium half isopropylamine salt of the double sulfosuccinic acid amide of soya fatty amine-propyl amines (R—NH— being the soya fatty amine radical)

(7) $\quad\quad\quad SO_3NH_4$
$\quad\quad\quad\quad\quad |$
$OC-CH_2-CH-COOH.H_2N-CH=(CH_3)_2$ $$R-N-C_3H_6-N=\left[\begin{array}{c}OC-CH-CH_2-COOH.H_2N-CH=(CH_3)_2\\ |\\ SO_3NH_4\end{array}\right]_2$$

Half ammonium half isopropylamine salt of the triple sulfosuccinic acid amide of soya fatty amine-propyl amines (R—N— being the soya fatty amine radical)

(8) $\quad\quad\quad\quad\quad\quad\quad (CH_2-COONH_4)_2$
$\quad\quad\quad\quad\quad\quad\quad\quad\quad\quad \|$
$C_{18}H_{37}-NH-OC-C-SO_3H.H_2N-CH=(CH_3)_2$ Two-thirds ammonium one-third isopropylamine salt of the sulfotricarballylic acid amide of stearyl amine (9) 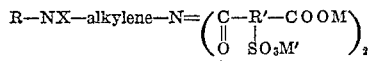
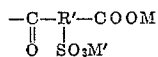

Half ammonium half isopropylamine salt of the sulfophthalic acid amide of dodecyl amine

(10) $C_{13}H_{27}-NH-OC-CH_2-CH-COOH.H_2N-CH=(CH_3)_2$
$\quad\quad\quad\quad\quad\quad\quad\quad\quad\quad\quad\quad | $
$\quad\quad\quad\quad\quad\quad\quad\quad\quad\quad\quad SO_3Li$ Half lithium half isopropylamine salt of the sulfosuccinic acid amide of tetradecyl amine

(11) $\quad\quad\quad\quad\quad CH_2-COOH.H_2N-CH=(CH_3)_2$
$\quad\quad\quad\quad\quad\quad\quad\quad\quad |$
$C_{17}H_{35}-NH-OC-C-SO_3H.H_2N-CH=(CH_3)_2$
$\quad\quad\quad\quad\quad\quad\quad\quad\quad |$
$\quad\quad\quad\quad\quad CH_2-COOH.H_2N-CH=(CH_3)_2$ Isopropylamine tri-salt of the sulfotricarballylic acid amide of stearyl amine The (a) ingredient, for instance, the half alkali metal half organic substituted ammonium salts of the sulfosuccinic acid amides of the long chain amines, can readily be made by reacting the long chain amine with maleic anhydride and heating to about 100 degrees C. to produce the maleic acid amide. The free carboxyl group of the maleic acid radical of said amide is then neutralized with an alkali metal or amine, and then the resulting compound is reacted with an alkali metal or amine bisulfite, as the case may be, in an aqueous or aqueous alcohol medium at 60 to 85 degrees C. The desired final product may be recovered and purified for use in the practice of my present invention although purification steps usually will not be necessary. The water content of said product, as used in the practice of my invention, should not exceed about 25% and, more advantageously, should be about 15% or less. It will be most convenient to introduce the sulfonic group into the molecule by the use of an alkali metal bisulfite, in which case the prior neutralization of the free carboxyl group of the maleic acid radical of the maleic acid amide will first have been carried out with the amine if a half alkali metal half organic substituted ammonium salt is to be prepared. It is not material to the success of my invention which of the M or the M' cation is an organic substituted ammonium radical but, as stated above, one of them should be an alkali metal and the other should be an organic substituted ammonium radical, or, in the broader aspect of my invention as I have shown, both M and M' can be an organic substituted ammonium cation. An alternative procedure involves neutralizing an alkali metal bisulfite with an amine and then utilizing the resulting amine neutralized alkali metal bisulfite in the reaction with the maleic acid amide of the long chain amine. In the formulae given above and in the claims for the (a) ingredient, it will be understood that the M and M' may be interchanged, that is, the M cation may be attached to the $SO_3$ radical and the M' cation may be attached to the free carboxyl group of the maleic acid radical, and the claims should be so read. It will be understood that the method of making the aforementioned salts of the sulfosuccinic acid or other sulfopolycarboxylic acid amides of the long chain amines forms no part of the present invention and various methods for the production of said compounds will readily suggest themselves to those skilled in the art in the light of the present disclosures.

The second of said ingredients, which may, for convenience, be called the (b) ingredient, is an amine salt of an alkyl benzene sulfonic acid in which the alkyl radical contains from 12 to 18 carbon atoms. The alkyl radical, which is advantageously predominately a single higher alkyl radical, may be derived from polypropylenes, kerosene fractions, or the like, contains predominately from 12 to 18 carbon atoms, and, especially, predominately from 12 to 15 carbon atoms. The benzene nucleus may also contain lower alkyl substituents, provided that the number of carbon atoms in such lower alkyl constituents is in the range of from 1 to 3 and the number of such lower alkyl substituents does not exceed 2. The number of sulfonic acid redicals in the benzene nucleus may be 1 or 2, but, especially, there is only approximately one sulfonic acid radical in the benzene nucleus. The (b) ingredient should be soluble in the organic solvents, such as the aromatic solvents, used in the production of the toxicant concentrates.

Certain of the higher alkyl benzene sulfonic acids which, in the form of their organic amine salts, are employed as the (b) ingredient in the practice of my invention can be represented by the formula

where R is a lower alkyl radical containing from 1 to 3 carbon atoms, such as methyl, ethyl, propyl and isopropyl, R' is a higher alkyl radical containing from 12 to 18 carbon atoms and especially from 12 to 15 carbon atoms, $n$ is zero to 2, and X is an organic amine cation.

Typical examples of the organic amines whose salts of the higher alkyl benzene sulfonic acids are employed as the (b) ingredient in accordance with my present invention are those which have been mentioned above as being representative of M' in the general formula for the (a) ingredient. Particularly preferred are the alkyl amines containing from 1 to 6 carbon atoms and the polyamines such as propylenediamine, diethylene triamine and the like, and especially preferred is isopropyl amine. Typical or illustrative examples of the organic amine salts of the higher alkyl benzene sulfonic acids the use of which is encompassed by my invention are the following: diisopropanolamine salt of dodecyl benzene mono-sulfonic acid; isopropylamine salt of dodecyl benzene mono-sulfonic acid; dimethylamine propylenediamine salt of dodecyl benzene mono-sulfonic acid; diisopropylamine salt of dodecyl toluene mono-sulfonic acid; furfurylamine salt of pentadecyl benzene mono-sulfonic acid; cyclohexylamine salt of dodecyl mono-sulfonic acid; diisopropylamine salt of dodecyl isopropyl benzene sulfonic acid; morpholine salt of octadecyl benzene mono-sulfonic acid; and triisopropylamine salt of octadecyl benzene di-sulfonic acid; and mixtures of two or more thereof. The isopropylamine salt of dodecyl benzene mono-sulfonic acid is unusually satisfactory as the (b) ingredient and its use, in the combinations here involved, represents an important, though limited, embodiment of my invention.

It will be understood, of course, that mixtures of any two or more of the (a) and any two or more of the (b) ingredients can be employed in the practice of my present invention.

The biocidal toxicants which are used in accordance with my present invention and which, as stated above, comprise insecticides and soil fumigants, may be selected from a wide group typical examples of which are "Aldrin" (1,2,3,4,10,10-hexachloro-1,4,4a,5,8,8a-hexahydro-1,4,5,8-dimethanonaphthalene); "Dieldrin" (1,2,3,4,10,10-hexachloro - 6,7 - epoxy - 1,4,4a,5,6,7,8,8a - octahydroxy - 1,4-endo-exo-5,8-dimethanonaphthalene); "Lindane" (gamma isomer of benzene hexachloride); "Heptachlor" (1,4,5,6,7,8,8 - heptachloro - 3a,4,7,7a - tetrahydro - 4,7 - endomethanoindene); "Nemagon" (1,2-dibromo - 3 - chloropane); ethylene dibromide; DDT; organic thiocyanates such as B-butoxy, B'-thiocyanodiethyl ether, bornyl thiocyanoacetate; trichlorobenzene; propyl, butyl, and amyl ethers of pentachlorophenol, and the like, and compatible mixtures of any two or more thereof. Of especial importance are "Aldrin," "Dieldrin," "Lindane," "Heptachlor," and "Nemagon."

The organic solvent which is utilized in the preparation of the biocidal toxicant concentrates of my present invention, and in which the biocidal toxicant is soluble, may be selected from a known group of such organic solvents. Such organic solvents are of the type which are insoluble in the aqueous phase and, at least in most cases, will be per se insoluble in water. For convenience, said organic solvents are referred to herein as being "water-insoluble," and the same is true of the biocidal toxicants, although the criterion is essential insolubility in the aqueous phase of the emulsion. These include, for instance, aromatic hydrocarbon solvents, or blends thereof with paraffinic or naphthenic solvents. Examples of such solvents are kerosene; light refined mineral oil; methylnaphthalenes such as monomethyl naphthalene, dimethyl naphthalene and trimethyl naphthalene; ethyl naphthalene; 2-methylpentanediol-1,2; dipropylene glycol methyl ethers; benzene, toluene, aromatic naphthas, xylene, tetrahydronaphthalene, cyclohexane, and the like. These and various other organic solvents are frequently sold under trade names, such as "Cyclosol 53," which is a xylene type solvent; and "Sovacide 544C," which is an aromatic petroleum oil containing methylated naphthalenes.

The (a) and (b) ingredients are incorporated into solutions of the biocidal toxicants in the selected organic solvent or mixtures of organic solvents to produce biocidal toxicant concentrates. Typical of such biocidal toxicant concentrates are so-called concentrates containing, for instance, 2 pounds "Heptachlor" per gallon; 1.5 pounds "Dieldrin" per gallon; 1 pound gamma equivalent benzene hexachloride per gallon; and 45% "Nemagon" concentrates. The content of the total of the (a) and (b) ingredients, by weight of the biocidal toxicant concentrate, will fall within the range of 3 to 30%, but, ordinarily, from 6 to 15%, and, particularly, from 8 to 12%, will be found quite satisfactory for most purposes. The relative proportions of the (a) and (b) ingredients, or, in other words, the weight ratio of the (a) to the (b) ingredient, should be at least 2 to 1, and is usually in the range of about 2 to about 20, preferably on an average of about 4 to 10, parts of the (a) ingredient to 1 part of the (b) ingredient. The upper limit of the (a) ingredient may, if desired, be at least several times the values recited above. Within the limits stated, the proportions of ingredients may be varied in order to obtain optimum results in connection with any particular liquid fertilizer solution.

The percentages or proportions of the (a) and (b) ingredients, as set forth above, are predicated on their being pure substances. In actual commercial practice, the (a) and (b) ingredients as prepared will not be in pure form and, indeed, it is unnecessary that they be used in pure form. Thus, for instance, in the case of the (a) ingredient used in Example A, it is prepared usually in the form of an approximately 60% to 65% active product, and the (b) ingredient used in said Example A is commonly prepared in the form of an approximately 95% active product. In using such unpurified reaction mixtures comprising the (a) and (b) ingredients, account should be taken of the active ingredient content thereof in selecting the percentages thereof to be used.

The liquid fertilizer solutions (with which the hereinabove described biocidal toxicant concentrates are admixed to form homogeneous emulsions or dispersions which are usable over periods of at least several hours) are, per se, well known in the art. They comprise aqueous solutions, usually strong or concentrated aqueous solutions even up to saturation, of water-soluble compounds which fall into the category of providing at least one of the elements potassium, nitrogen and phosphorus, including, among others, as previously pointed out, potassium chloride, potassium nitrate, potassium sulphate, ammonium nitrate, ammonium sulphate, ammonium phosphate, aqueous ammonia, and the like, as well as organic water-soluble fertilizer materials particularly in conjunction with the inorganic water-soluble salts, such as those mentioned above, an especially preferred example of such organic water-soluble fertilizer material being urea. The liquid fertilizers, which will normally include one or more of the aforementioned materials, may be standardized as to their nitrogen, phosphorus (as $P_2O_5$) and potassium (as $K_2O$) contents. Typical examples of liquid fertilizer solutions, which can be used in conjunction with the novel biocidal toxicant concentrates of my invention are shown in a bulletin entitled "Preparation of Liquid Fertilizers," second edition, published by Victor Chemical Works, Chicago, Illinois.

The following examples are illustrative of biocidal toxicant concentrates, and dispersant compositions for use therein, falling within the scope of my invention. Other specific embodiments will readily occur to those skilled in the art in the light of the guiding teachings and principles disclosed herein. All parts listed are by weight percent.

Example A

| | Parts |
|---|---|
| Dieldrin (99%) | 18 |
| Xylene | 72 |
| Half ammonium half isopropylamine salt of the sulfosuccinic acid amide of dodecyl amine | 9.2 |
| Isopropylamine salt of dodecyl benzene sulfonic acid | 0.8 |

Example B

| | |
|---|---|
| Lindane (40% benzene hexachloride, gamma isomer) | 30 |
| Xylene | 60 |
| Half ammonium half isopropylamine salt of the sulfosuccinic acid amide of soya fatty amines | 8.8 |
| Dimethylamine propylenediamine salt of dodecyl benzene sulfonic acid | 1.2 |

Example C

| | |
|---|---|
| Dieldrin (99%) | 18 |
| Xylene | 72 |
| Half ammonium half isopropylamine salt of the double sulfosuccinic acid amide of soya fatty amine-propyl amines | 8.7 |
| Isopropylamine salt of dodecyl benzene sulfonic acid | 1.3 |

Example D

| | |
|---|---|
| Lindane (40% benzene hexachloride, gamma isomer) | 30 |
| Xylene | 60 |
| Half sodium half cyclohexylamine salt of the sulfosuccinic acid amide of hexadecylamine | 8.5 |
| Isopropylamine salt of dodecyl toluene sulfonic acid | 1.5 |

Example E

| | |
|---|---|
| Aldrin (90%) | 47 |
| Xylene | 43 |
| Half ammonium half isopropylamine salt of the triple sulfosuccinic acid amide of tall oil amine-propyl amines | 8.3 |
| Isopropylamine salt of dodecyl benzene sulfonic acid | 1.7 |

Example F

| | |
|---|---|
| Benzene hexachloride (40% gamma isomer) | 30 |
| Xylene | 60 |
| Isopropylamine di-salt of the sulfosuccinic acid amide of stearyl amine | 8.5 |
| Cyclohexylamine salt of pentadecyl benzene sulfonic acid | 1.5 |

Example G

| | |
|---|---|
| Nemagon | 45 |
| Xylene | 45 |
| Half ammonium half isopropylamine salt of the sulfosuccinic acid amide of soya fatty amines | 8.2 |
| Isopropylamine salt of dodecyl benzene sulfonic acid | 1.8 |

Example H

| | |
|---|---|
| Heptachlor | 34 |
| Sovacide 544C | 56 |
| Half sodium half isobutylamine salt of the sulfosuccinic acid amide of dodecyl amine | 8.5 |
| Isobutylamine salt of dodecyl toluene sulfonic acid | 1.5 |

Example I

| | |
|---|---|
| Aldrin | 43.3 |
| Kerosene | 13.7 |
| Xylene | 27.5 |
| Half ammonium half isopropylamine salt of the sulfotricarballylic acid amide of hexadecylamine | 13 |
| Isopropylamine salt of dodecyl toluene sulfonic acid | 2.5 |

Example J

| | |
|---|---|
| Aldrin | 25.0 |
| Kerosene | 33.0 |
| Aromatic hydrocarbon solvent | 34.5 |
| Aminoethylethanolamine di-salt of the sulfosuccinic acid amide of stearyl amine | 6.0 |
| Aminoethylethanolamine salt of dodecyl benzene sulfonic acid | 1.5 |

Example K

| | Parts |
|---|---|
| Aldrin (90%) | 27.6 |
| Kerosene (deodorized) | 32 |
| Cyclosol 53 (organic solvent) | 30.4 |
| Half ammonium half isopropylamine salt of the sulfosuccinic acid amide of abietyl amine | 8 |
| Isopropylamine salt of dodecyl benzene sulfonic acid | 2 |

Example L

| | Parts |
|---|---|
| Dieldrin (99%) | 18.2 |
| Heavy aromatic naphtha | 71.8 |
| Isopropylamine di-salt of the sulfosuccinic acid amide of oleyl amine | 7.1 |
| Isopropylamine salt of dodecyl benzene sulfonic acid | 2.9 |

Example M

| | Parts |
|---|---|
| Nemagon | 45 |
| Xylene | 45 |
| Isopropylamine tri-salt of the sulfotricarballylic acid amide of soya fatty amines | 8 |
| Isopropylamine salt of dodecyl benzene sulfonic acid | 2 |

Example N

| | Parts |
|---|---|
| Heptachlor | 32.5 |
| Sovacide 544C | 57.5 |
| Isopropylamine tri-salt of the sulfotricarballylic acid amide of dodecyl amine | 8 |
| Isopropylamine salt of dodecyl toluene sulfonic acid | 2 |

Example O

| | Parts |
|---|---|
| Half ammonium half isopropylamine salt of the sulfosuccinic acid amide of soya fatty amines | 8.8 |
| Dimethylamine propylenediamine salt of dodecyl benzene sulfonic acid | 1.2 |

Example P

| | Parts |
|---|---|
| Half ammonium half isopropylamine salt of the double sulfosuccinic acid amide of soya fatty amine-propyl amines | 8.7 |
| Isopropylamine salt of dodecyl benzene sulfonic acid | 1.3 |

Example Q

| | Parts |
|---|---|
| Half ammonium half isopropylamine salt of the triple sulfosuccinic acid amide of tall oil amine-propyl amines | 8.3 |
| Isopropylamine salt of dodecyl benzene sulfonic acid | 1.7 |

Example R

| | Parts |
|---|---|
| Isopropylamine di-salt of the sulfophthalic acid amide of dodecyl amine | 8.6 |
| Isopropylamine salt of pentadecyl benzene sulfonic acid | 1.4 |

Example S

| | Parts |
|---|---|
| Half ammonium half isopropylamine salt of the sulfosuccinic acid amide of dodecyl amine | 9 |
| Isopropylamine salt of dodecyl benzene sulfonic acid | 1 |

Example T

| | Parts |
|---|---|
| Isopropylamine di-salt of the sulfosuccinic acid amide of hexadecyl amine | 5 |
| Isopropylamine salt of dodecyl benzene sulfonic acid | 1 |
| Kerosene | 1.5 |
| Cyclosol 53 (organic solvent) | 15 |

Example U

| | Parts |
|---|---|
| Half sodium half cyclohexylamine salt of the sulfosuccinic acid amide of dodecyl amine | 8 |
| Cyclohexylamine salt of dodecyl toluene sulfonic acid | 2 |

Example V

| | Parts |
|---|---|
| Half ammonium half butylamine salt of the sulfosuccinic acid amide of tetradecyl amine | 9 |
| Butylamine salt of dodecyl benzene sulfonic acid | 1 |

Example W

| | Parts |
|---|---|
| Half ammonium half isopropylamine salt of the sulfosuccinic acid amide of stearyl amine | 6 |
| Isopropylamine salt of dodecyl benzene sulfonic acid | 1.2 |

Example X

| | Parts |
|---|---|
| Isopropylamine di-salt of the sulfosuccinic acid amide of dodecyl amine | 5 |
| Isopropylamine salt of dodecyl benzene sulfonic acid | 1 |
| Kerosene | 1.5 |
| Cyclosol 53 (organic solvent) | 15 |

Example Y

| | Parts |
|---|---|
| One-third sodium two-thirds isopropylamine salt of the sulfotricarballylic acid amide of hexadecyl amine | 7.8 |
| Isopropylamine salt of dodecyl toluene sulfonic acid | 2 |

Example Z

| | Parts |
|---|---|
| Half sodium half isopropylamine salt of the sulfophthalic acid amide of dodecyl amine | 9 |
| Isobutylamine salt of tetradecyl benzene sulfonic acid | 1.3 |

The weight ratio between the oleaginous phase, represented by the toxicant concentrate, and the aqueous phase, represented by the strong or concentrated aqueous solution of fertilizer ingredients, can range from 1 to 1 or up to 1 to 10. However, in the usual case of the use of the biocidal toxicant concentrates of my present invention, the amount of the liquid fertilizer solution will be many times the amount of the biocidal toxicant concentrate. In other words, most commonly the aqueous phase of the emulsion will be present in large excess over the oleaginous phase present in the biocidal toxicant concentrate. While such excess may vary somewhat, in the usual case it will be in the range of about 25 or 30 to 60 or even more times that of the oleaginous phase, but will usually be from about 30 to 40 times that of the oleaginous phase, all in terms of parts by weight.

In the use of the biocidal toxicant concentrates of my invention, the same are simply admixed with the aqueous or liquid fertilizer solution, with suitable agitation. For instance, 1 part of the toxicant concentrate of Example A is admixed, with stirring, with 30 parts of a liquid fertilizer solution comprising a 43% solution in water of liquid fertilizer (8–24–0 diammonium phosphate solution). In another typical example, 1 part of the toxicant concentrate of Example B is admixed with 30 parts of an about 80% aqueous fertilizer solution of Uran (32–0–0) comprising ammonium nitrate and urea. Again, 1 part of the toxicant concentrate of Example C is admixed with 30 parts of an 8–8–8 liquid fertilizer comprising a 39% solution made up of urea, diammonium phosphate and potassium chloride. Other illustrative commercial types of liquid fertilizer solutions with which my novel biocidal toxicant concentrates can be used are the so-called 8–25–0 (derived from ammonium phosphate); and 10–20–0 (derived from ammonium phosphate and urea).

The dispersant compositions of the present invention have unusual utility in connection with the production of toxicant concentrates for use in conjunction with aqueous solutions containing high concentrations of fertilizer ingredients, all as has been described above in detail. They have a broader utility, however, namely, in connection with the production of stable emulsions of oleaginous and aqueous materials in the presence of high concentrations of ionizable materials, notably, inorganic salts. It is well known that the presence of ionizable materials such as sodium chloride, sodium sulfate, magnesium chloride, magnesium sulfate and other monovalent and polyvalent inorganic salts, in oleaginous-aqueous emulsion systems, very seriously affects the stabilities of such emulsions, especially where the concentrations of said salts in the aqueous phase is of the order of even a few percent. The dispersant compositions of this invention make possible the production of stable emulsions even under the highly adverse environmental conditions of high concentrations of strongly ionizable salts.

What I claim as new and desire to protect by Letters Patent of the United States is:

1. A dispersant composition, having the property of being soluble in organic solvent solutions of water-insoluble biocidal toxicants, comprising (a) a compound in the form of a sulfopolycarboxylic acid amide of a higher molecular weight amine in which the amine contains a hydrocarbon radical having ter-insoluble biocidal toxicants, comprising (a) a compound corresponding to the formula

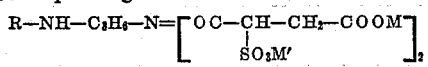

wherein R is the hydrocarbon radical of a long chain fatty amine, and M and M' are dissimilar and are selected from the group consisting of alkali metals and isopropylamine, and (b) the isopropylamine salt of dodecyl benzene sulfonic acid, the weight ratio of said (a) to said (b) ingredient being from about 2 to 6 of (a) to 1 of (b).

10. A dispersant composition, having the property of being soluble in organic solvent solutions of organic water-insoluble biocidal toxicants, comprising (a) a compound corresponding to the formula

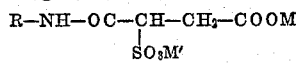

wherein R is a hydrocarbon radical containing from 12 to 26 carbon atoms, and M and M' are dissimilar and are selected from the group consisting of alkali metals and isopropylamine, and (b) a polyamine salt of dodecyl benzene sulfonic acid, the weight ratio of said (a) to said (b) ingredient being from about 2 to about 6 of (a) to 1 of (b).

11. A toxicant concentrate comprising an organic solvent solution of an organic water-insoluble biocidal toxicant and containing, dissolved therein, (a) a compound in the form of a sulfopolycarboxylic acid amide of a higher molecular weight amine in which the amine contains a hydrocarbon radical having from 12 to 26 carbon atoms, the sulfopolycarboxylic acid radical being represented by the formula

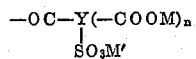

wherein Y is the completely decarboxylated residue of a polycarboxylic acid containing from 4 to 8 carbon atoms; M and M' are members of the group consisting of alkali metals and organic substituted ammonium radicals with the proviso that at least one of them is an organic substituted ammonium radical; and n is 1 or 2; and (b) an amine salt of an alkyl benzene sulfonic acid in which the alkyl radical contains from 12 to 18 carbon atoms, the weight ratio of said (a) to said (b) ingredient being at least 2 to 1, the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

12. The composition of claim 11, wherein the biocidal toxicant is at least one member selected from the group consisting of 1,2,3,4,10,10-hexachloro-1,4,4a,5,8,8a-hexahydro-1,4,5,8-dimethanonaphthalene; 1,2,3,4,10,10-hexachloro-6,7-epoxy, 1,4,4a,5,6,7,8,8a-octahydroxy-1,4-endoexo-5,8-dimethanonaphthalene; gamma isomer of benzene hexachloride; 1,4,5,6,7,8,8-heptachloro-3a,4,7,7a-tetrahydro-4,7-endo-methanoindene; and 1,2-dibromo-3-chloropropane.

13. A toxicant concentrate comprising an organic solvent solution of an organic water-insoluble biocidal toxicant and containing, dissolved therein, (a) a compound corresponding to the formula

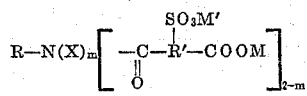

wherein R is an aliphatic hydrocarbon radical containing from 12 to 26 carbon atoms; X is hydrogen; R' is the completely decarboxylated residue of a polycarboxylic acid containing from 4 to 8 carbon atoms; M and M' are members selected from the group consisting of alkali metals and lower organic substituted ammonium radicals with the proviso that at least one of them is a lower organic substituted ammonium radical; and m is zero or 1; and (b) an amine salt of an alkyl benzene sulfonic acid in which the alkyl radical contains from 12 to 18 carbon atoms, the weight ratio of said (a) to said (b) ingredient being at least 2 to 1.

14. A toxicant concentrate comprising an organic solvent solution of an organic water-insoluble biocidal toxicant and containing, dissolved therein, (a) a compound corresponding to the formula

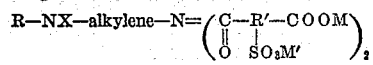

wherein R is an aliphatic hydrocarbon radical containing from 12 to 26 carbon atoms; X is hydrogen or

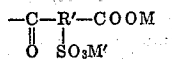

alkylene is an alkylene radical containing from 2 to 8 carbon atoms; R' is the completely decarboxylated residue of a polycarboxylic acid containing from 4 to 8 carbon atoms; M and M' are members selected from the group consisting of alkali metals and lower organic substituted ammonium radicals with the proviso that at least one of them is a lower organic substituted ammonium radical; and (b) an amine salt of an alkyl benzene sulfonic acid in which the alkyl radical contains from 12 to 18 carbon atoms, the weight ratio of said (a) to said (b) ingredient being at least 2 to 1.

15. A toxicant concentrate in accordance with claim 11, wherein M and M' are alkyl amines containing from 1 to 6 carbon atoms, the amine salt of the alkyl benzene sulfonic acid is an alkyl amine containing from 1 to 6 carbon atoms, and wherein the total of said (a) and (b) ingredients constitutes from 6 to 15%, by weight, of said concentrate.

16. A toxicant concentrate comprising an organic solvent solution of an organic water-insoluble biocidal toxicant and containing, dissolved therein, (a) a compound in the form of a sulfopolycarboxylic acid amide of a higher molecular weight amine in which the amine contains a hydrocarbon radical having from 12 to 26 carbon atoms, the sulfopolycarboxylic acid radical being represented by the formula

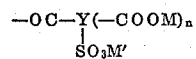

wherein Y is the completely decarboxylated residue of a polycarboxylic acid containing from 4 to 8 carbon atoms; M and M' are members of the group consisting of alkali metals and organic substituted ammonium radicals with the proviso that at least one of them is an organic substituted ammonium radical; and n is 1 or 2; and (b) an alkyl amine salt of an alkyl benzene sulfonic acid corresponding to the formula

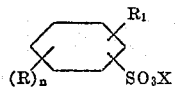

where R is a lower alkyl radical containing from 1 to 3 carbon atoms, R' is a higher alkyl radical containing from 12 to 18 carbon atoms, n is zero to 2, and X is an organic amine cation, the weight ratio of said (a) to said (b) ingredient being at least 2 to 1, the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

17. A toxicant concentrate comprising an organic solvent solution of an organic water-insoluble biocidal toxicant and containing, dissolved therein, (a) an organic substituted ammonium di-salt of a sulfosuccinic acid amide of a long chain amine containing a hydrocarbon radical having from 12 to 26 carbon atoms, and (b) an amine salt of dodecyl benzene sulfonic acid, the weight ratio of said (a) to said (b) ingredient being at least 2 to 1, and the total of said (a) and (b) ingredients constituting from 3 to 15%, by weight, of said concentrate, said concentrate being adapted, upon admixture with aqueous solutions containing upwards of 20% of fertilizer ingredients, to form a homogeneous dispersion usable for periods of the order of at least several hours.

18. A toxicant concentrate comprising an organic solvent solution of an organic water-insoluble biocidal toxicant and containing, dissolved therein, (a) a compound corresponding to the formula

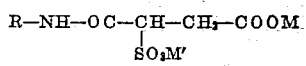

wherein R is an aliphatic hydrocarbon radical containing from 12 to 18 carbon atoms, and M and M' are dissimilar and are selected from the group consisting of ammonium and isopropylamine, and (b) the isopropyl amine salt of dodecyl benzene sulfonic acid, the weight ratio of said (a) to said (b) ingredient being from about 2 to about 20 of (a) to 1 of (b), the total of said (a) and (b) ingredients constituting from 3 to 15%, by weight, of said concentrate, said concentrate being adapted, upon admixture with aqueous solutions containing upwards of 20% of fertilizer ingredients, to form a homogeneous dispersion usable for periods of the order of at least several hours.

19. A toxicant concentrate comprising an organic solvent solution of an organic water-insoluble biocidal toxicant and containing, dissolved therein, (a) a compound corresponding to the formula

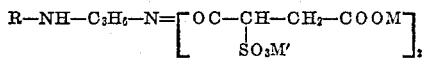

wherein R is the hydrocarbon radical of a long chain fatty amine, and M and M' are dissimilar and are selected from the group consisting of ammonium and isopropylamine, and (b) the isopropyl amine salt of dodecyl benzene sulfonic acid, the weight ratio of said (a) to said (b) ingredient being about 4 to 10 of (a) to 1 of (b), the total of said (a) and (b) ingredients constituting from 3 to 15%, by weight, of said concentrate, said concentrate being adapted, upon admixture with aqueous solutions containing upwards of 20% of fertilizer ingredients, to form a homogeneous dispersion usable for periods of the order of at least several hours.

References Cited in the file of this patent

UNITED STATES PATENTS

| | | |
|---|---|---|
| 2,198,806 | Epstein | Apr. 30, 1940 |
| 2,239,720 | Katzman | Apr. 29, 1941 |
| 2,251,940 | Katzman | Aug. 12, 1941 |
| 2,322,783 | Katzman | June 29, 1943 |
| 2,731,338 | Fike | Jan. 17, 1956 |
| 2,776,987 | Tawney | Jan. 8, 1957 |

OTHER REFERENCES

Brown: "Formulation of Emulsions," Soap and Sanitary Chem., July 1951, pp. 43, 45, 47 and 49.

Handbook of Aldrin, Dieldrin and Endrin Formulations, Shell Chem. Corp., N.Y., 1954, pp. 33–38 relied upon.